United States Patent [19]
Liebel, Jr.

[11] 3,969,704
[45] July 13, 1976

[54] WORD TRANSFORMATION APPARATUS FOR DIGITAL INFORMATION PROCESSING

[75] Inventor: John T. Liebel, Jr., Williamsville, N.Y.

[73] Assignee: Nanodata Corporation, Williamsville, N.Y.

[22] Filed: July 19, 1974

[21] Appl. No.: 490,113

[52] U.S. Cl. .............................................. 340/172.5
[51] Int. Cl.² ............................................ G06F 7/00
[58] Field of Search ................................. 340/172.5

[56] References Cited
UNITED STATES PATENTS

| | | | |
|---|---|---|---|
| 3,343,139 | 9/1967 | Ulrich | 340/172.5 |
| 3,543,245 | 11/1970 | Nutter | 340/172.5 |
| 3,634,882 | 1/1972 | McIlroy | 340/172.5 |
| 3,657,705 | 4/1972 | Mekota et al. | 340/172.5 |

Primary Examiner—David H. Malzahn
Attorney, Agent, or Firm—Christel & Bean

[57] ABSTRACT

Word transformation apparatus comprising word position changing means in the form of a shift register which receives coded information words and changes the format or relative positions of portions of a word by means of a controlled rotational shift to place the portion of the word which is of interest in a predetermined location therein. A selective gating means is controlled to transmit only that portion of the word for utilization in the information processing system associated with the apparatus. An adder can be connected to the output of the gating means for adding an index quantity to the word portion when, for example, it is utilized to address a predetermined range of an addressable storage means in the system.

10 Claims, 3 Drawing Figures

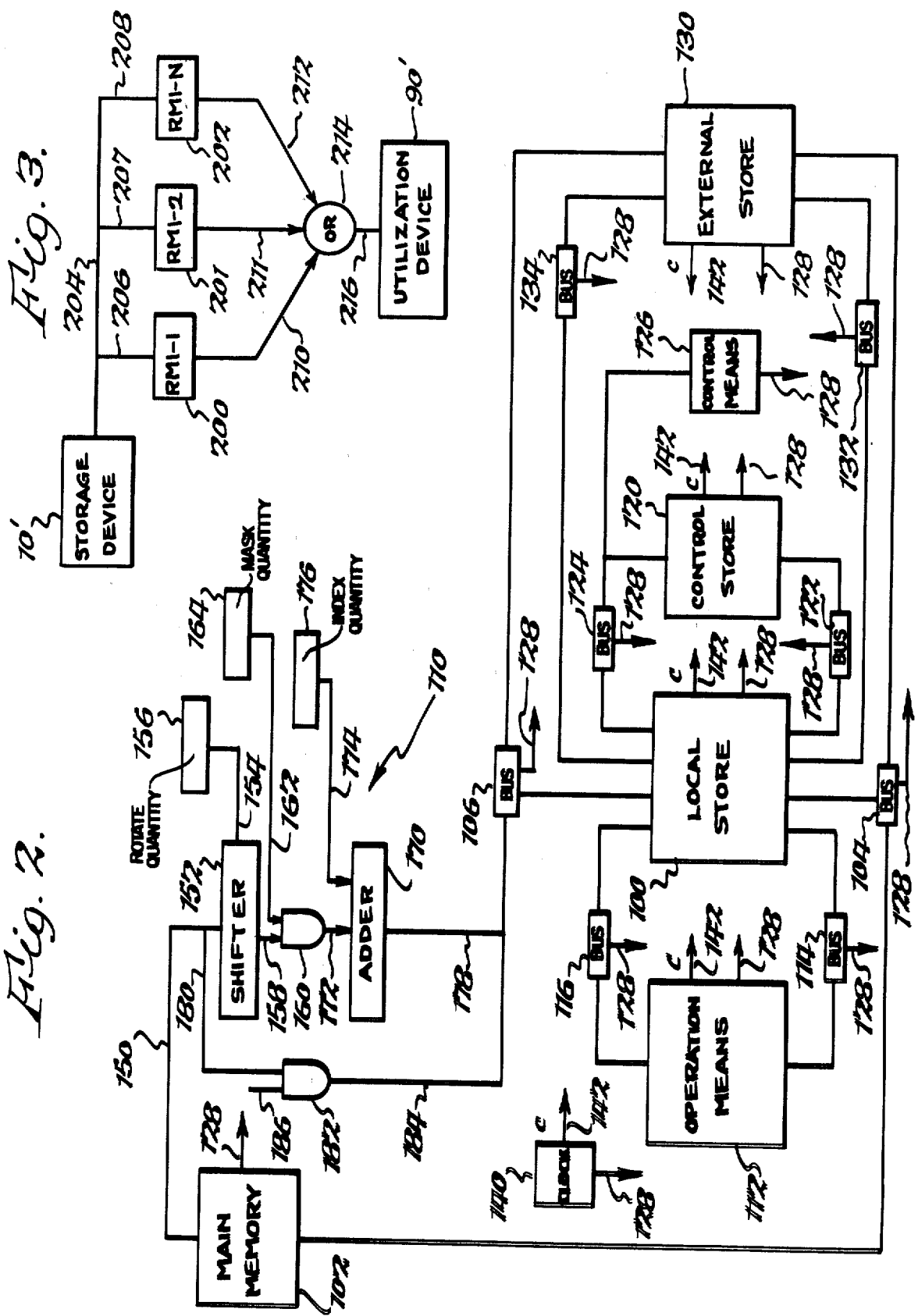

WORD TRANSFORMATION APPARATUS FOR DIGITAL INFORMATION PROCESSING

BACKGROUND OF THE INVENTION

This invention relates to the art of digital information processing, and more particularly to a new and improved apparatus for processing coded information words to obtain selected information therefrom.

In digital information processing systems, information is transmitted between locations in the system in the form of words which are ordered sets of digits which are processed each as a unit in the system. The individual digits or groups of digits in a word can represent different types of information such as data to be processed by the system, instructions telling the system what type of operation to perform, and addresses specifying locations in the system where various imformation quantities are to be stored. The arrangement of digits or groups thereof in a word representing different types of information is known as its format. It is often desired to inspect or utilize only one of the types of information contained in the words at a given stage in the operation of the system. This poses a problem when the system has been processing words of a given format and then it receives words of a different format.

One area of use of the present invention is in digital data processing systems that emulate both new and prior art computer systems or the like. The machine language of a particular computer is the collection of all permissible machine instructions it can understand and execute, and the number, meaning and format of these machine instructions are known to vary greatly from one make or model computer to the next. Furthermore, as new and improved computing hardware is developed, it often becomes necessary to use a new and improved word format to take advantage of the improved features of the new generation equipment.

These developments, in turn, have caused significant problems for the computer user. For example, when the user of an older generation computer replaces it with a new computer he often is faced with a costly and time consuming problem of rewriting his proven and useful programs so that they can be used with the newer generation computer. A related problem faces the user of large scale computer installations including a number of computer systems which can have different machine language repertoires. A program written for one computer system of the user may not perform on another system of the same user, and this problem can increase as the user adds new equipment to his installation.

Accordingly, in recent times digital computers have been developed which have the capability of emulating other machines. The instruction words of the machine being emulated are stored in the main memory of the host machine, and in most instances the format of the instruction words of the machine being emulated is different from the format of the instruction words of the host machine. Therefore, it is necessary to rearrange the bits or groups of bits in the instruction words of the machine being emulated before they are processed by the host machine.

SUMMARY OF THE INVENTION

It is, therefore, an object of this invention to provide a new and improved apparatus for changing the format of coded information words in digital information processing systems.

It is a further object of this invention to provide such apparatus capable of changing the relative positions of portions of a word to place the portion of interest in a predetermined location in the word for utilization.

It is a further object of this invention to provide such apparatus which is highly effective in operation yet relatively simple in construction.

It is a further object of this invention to provide a new and improved digital data processing system including apparatus for changing the format of coded information words transmitted through the system.

It is a further object of this invention to provide a new and improved digital data processing system including apparatus for changing the relative positions of a word to place the portion of interest in a predetermined location in the word for utilization in the system.

The present invention provides word transformation apparatus for use in a digital information processing system wherein coded information words are transmitted from a first location in the system, such as a main memory, through a path to a second location, such as a local store, for utilization by the system. The relative positions of portions of a word are changed in a predetermined manner so that a portion of the word which is of current interest is placed in a predetermined location in the word. Only the portion of the word placed in the predetermined location is gated to the path for transmission to the second location. An index quantity may be added to the word portion before it is transmitted to the second system location. The foregoing is accomplished by shift register means performing a rotational shift in accordance with a rotational parameter supplied thereto from a suitable source, an AND gate network connected to the output of the shift register means and controlled by a mask parameter source, and an adder having one input connected to the gate network and the other input connected to an index parameter source.

The foregoing and additional advantages and characterizing features of the present invention will be clearly apparent from a reading of the ensuing detailed description together with the included drawing wherein:

BRIEF DESCRIPTION OF THE DRAWING FIGURES

FIG. 2 is a schematic block diagram of a digital data processing system provided with word transformation apparatus according to the present invention; and FIG. 3 is a schematic block diagram of an arrangement of a plurality of units of the word transformation apparatus according to the present invention in a digital information processing system.

DETAILED DESCRIPTION OF THE ILLUSTRATED EMBODIMENTS

Figure 1:
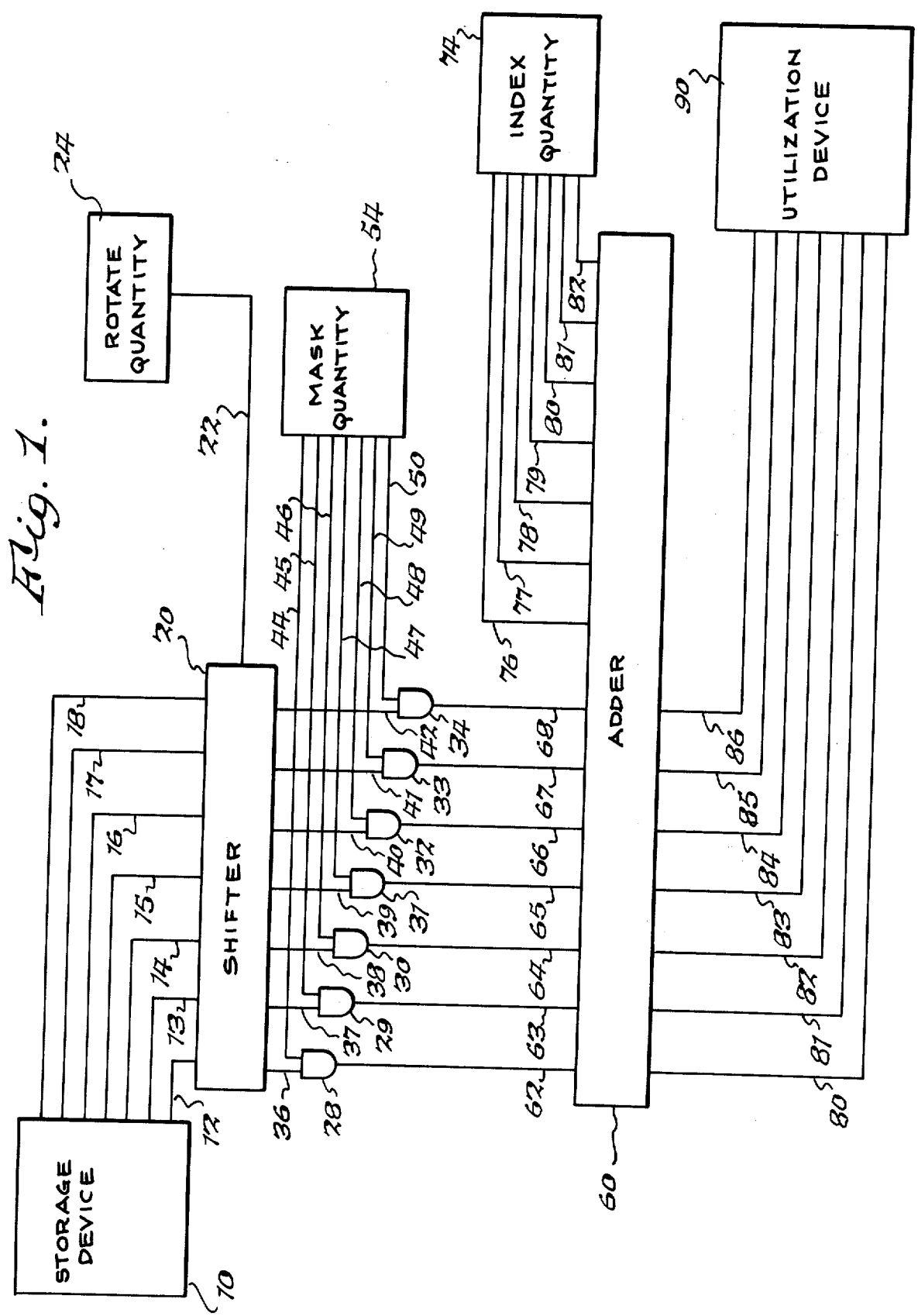
FIG. 1 is a schematic block diagram of word transformation apparatus according to the present invention for use in a digital information processing system.

Referring now to FIG. 1, the apparatus of the present invention is included in a portion of a digital information processing system wherein coded information words are transmitted from a first location in the system through a path to a second location for utilization by the system. The words contain ordered sets of binary digits or bits and contain information in the form of data to be processed in the system, instructions for controlling the system, or both. The words can be of any suitable length as determined by the requirements of the system. In the present instance, the first location from which the words are transmitted is shown in the form of a storage device 10 from which words are selectively taken for transmission to other parts of the system. It is to be understood, however, that the apparatus of the present invention in its general application can receive words from any location in a digital information processing system wherein there is a need to change the format of the words at another location in the system. In the present example the words are seven bits in length, and accordingly seven lines 12–18 are provided for the respective bit locations. Lines 12–18 together form a path for transmitting words from a first location in the system i.e. from storage device 10, to a second location for utilization by the system.

The word transformation apparatus according to the present invention comprises word position changing means having an input connected to the path to receive words from the first location in the system and operative to change the relative positions of portions of the words received thereby in a predetermined manner so that the portion of the word which is of current interest is placed in a predetermined location in the word. In preferred form, the word position or format changing means comprises shift register means 20 having a width equal to the width of the system path, i.e. having a number of bit positions equal to the number of bits in the words which travel through the system path. Accordingly, shift register means 20 of FIG. 1 if 7 bits wide, the inputs, of which are connected to the line 12–18 of the system path. Shift register means 20 operates to rotate the bits of a word placed therein so as to change the relative positions of bits or groups of bits and the number of bit positions in the rotation is determined by the decoded value of a quantity present in a path 22 connected to shift register 20. In particular, shifter 20 is connected in a manner such that bits which are shifted out of one end thereof enter the other end, i.e. preferably those shifted out the high order end of shifter 20 enter the low order end. The number of bits transmitted in path 22 will depend upon the maximum rotation which, in turn, is determined by the word length. The control quantity transmitted to shifter 20 is obtained from a register or similar storage means 24 in an appropriate location in the system. After shift register means 20 rotates the bits of a word placed therein a predetermined number of bit positions as determined by the quantity transmitted from source 24, the word format is changed or varied so that the portion of current interest is placed in a predetermined location in the word. According to a preferred mode of the present invention, this preferred location will be a predetermined number of the low order bits in the word, for example the three lowest order bits.

The apparatus of the present invention further comprises selective gating means having an input connected to the output of the word position changing or format varying means and an output connected to the system path and operative to gate only the word portion of current interest, which portion has been placed in the predetermined location as described above, to the system path for transmission to the second location for utilization by the system. In particular, the selective gating means comprises a plurality of AND gates 28–34 equal in number to the number of output bit positions of shifter 20. Each output bit position of shifter 20 is connected by a corresponding one of lines 36–42 to one input of the corresponding AND gates 28–34 is connected by a corresponding one of the lines 44–50, respectively, to a source 54 of a control quantity for controlling the AND gates 28–34. Source 54 can comprise a register appropriately located in the system. For convenience in description, source 54 can be termed a mask register, and accordingly the bits present in shifter 20 will be gated through the network of AND gates 28–34 only if a logical one is present in the corresponding bit position of the mask register 54. In this manner, only selected bits or groups of bits in the word are gated to the remainder of the system, and these selective bits or group thereof are the portion of current interest as described above.

In some instances, the word is transmitted directly from the outputs of AND gates 28–34 through the system path to a second location in the system for utilization therein. In other instances, the bits or groups thereof of current interest serve to point or to address a particular quantity stored elsewhere in the system. For example, that quantity may be located in a storage means or memory within a predetermined range of address locations, i.e. in a storage means having address locations of zero to 300 the quantity may be located between 200 and 250, the particular address in this range being provided by the bits of interest in the transformed word. In this situation it is necessary to add a predetermined quantity or index number to the bits of interest whereby they can perform their function of addressing a particular word or instruction stored in the system. According to the foregoing example, the index number would be 200. Therefore, the apparatus can further comprise index means connected to the output of the selective gating means for adding a predetermined quantity to the word portion before it is transmitted for utilization in the system. In particular, the index means comprises a binary adder 60 having input bit positions connected by lines 62–68 to the outputs of AND gates 28–34, respectively. Thus the bit positions of the word transmitted from the selective gating means comprise one input quantity to adder 60, the other input quantity being the predetermined quantity or index value added thereto which is obtained from a suitable storage means or register 74 and transmitted to adder 60 by an appropriate number of lines, in the present instance the lines 76–82 connected to corresponding inputs of adder 60. Thus adder 60 functions to add the quantities and produce a result which is transmitted through the system path provided by lines 80–86 connected to the outputs of adder 60 to the second location in the system which is designated a utilization device 90 in the present illustration. Device 90 can be of various types and forms, one example would be a storage means wherein the words which are processed by the apparatus of the present invention are temporarily stored for further use in the information processing system.

The apparatus of the present invention operates in the following manner. Assume that the high order three bits of a word from storage device 10 contain the information of interest and it is necessary to have the bits of interest in the low order positions for processing in the system. Thus in a word input to shifter 20, the bits of interest will be on lines 12, 13 and 14, and three rotary shifts must be performed by shifter 20 in order to move the bits on lines 12–14 at the three high order positions of shifter 20 to the three low order positions. Accordingly, a quantity from register 24 is transmitted through path 22 causing shifter 20 to execute the three rotary shifts. When this is done, the bits which were on lines 12, 13 and 14 will be present on lines 40, 41 and 42, respectively, leading from the output of shifter 20.

Only the three bits at the low order positions of shifter 20 are of interest to the system so only these bits are gated or transmitted and the remaining four bits are masked. To accomplish this, the mask quantity stored in register 54 includes a logical zero at the four remaining bit positions. Thus the logical one signals on lines 48, 49 and 50 cause AND gates 32, 33 and 34, respectively, to gate the bits on lines 40, 41 and 42 to lines 66, 67 and 68, respectively. The logical zeros on lines 44–47 inhibit the operation of gates 28–31.

The bits of interest present on lines 66, 67 and 68 could be applied directly to a component of the information processing system for inspection, temporary storage or other typical operations. In the present illustration, assume that the quantity represented by the bits on lines 66–68 serves to address quantities stored in utilization device 90 within a particular range of address locations, the first address in the range being ten. Thus ten is an index quantity to be added to the bits, and the index quantity is obtained from register 74 and transmitted through the path represented by lines 76–82 to adder 60 wherein it is added to the qunatity represented by the bits on lines 66–68. The sum of these two quantities is transmitted through the path represented by lines 80–86 to device 90 wherein it is used to address a quantity therein as explained before.

THe particular rotate, mask and index quantities stored in registers 24, 54 and 74, respectively, can of course be changed according to system requirements. The location of the bits of interest in an input word present on lines 12–18 relative to the desired location of these bits in the system path comprising lines 36–42 determines the rotate quantity. The rotate quantity, in turn, controls shifter 20. The location of the bits of interest in the system path comprising lines 36–42 and 62–68 determines the mask quantity which, in turn, controls the operation of gates 28–34. The particular range of address locations in component 90 in the present illustration determines the index quantity to be stored in register 74.

FIG. 2 shows the apparatus of the present invention included in a digital data processing system. The apparatus of the present invention can be included in many different types of data processing systems, and it is to be understood the system of FIG. 2 is merely illustrative of these various types of systems with which the apparatus of the present invention can be advantageously used. The data processing system illustrated herein includes a local storage means 100 which comprises a plurality of registers which provide the working registers for the data processing system. The system further comprises a main memory 102 which is operatively connected to local storage means 100 through suitable buses designated 104 and 106 in FIG. 2. It is to be understood that the abbreviated block diagram representation of main memory 102 is intended to include the usual arrangement of address and storage registers which are included with a memory unit in standard data processing systems. Separate buses can be provided to transmit data and address information from storage means 100 to main memory 102, but due to the relatively high speed of control functions provided in some computers relative to the time required to read or write memories such as main memory 102, the bus 104 can be time-shared between the address and data functions under program control. After being fetched, a word from main memory 102 is gated to local storage means 100 through bus 106. According to the present invention, the word transformation of format varying apparatus of the present invention, generally designated 110 in FIG. 2. is connected between the output of main memory 102 and the input of local storage means 100. The apparatus 110 is similar in construction and operation to the apparatus of FIG. 1 and will be described in detail presently.

Data processing system of FIG. 2 further comprises operation means generally designated 112 connected to local storage means 100 through buses 114 and 116. The operation means 112 would include a standard arithmetic unit and in some instances also a shifter for performing particular operations on words transmitted to it from local storage means 100 as determined by an operation code applied to means 112 from the system control unit in a manner which is readily understood by those skilled in the art. Words selected from local storage means 100 are transmitted through bus 114 under program control to the input of operation means 112 therein operations are performed on the word and the output result is transmitted through bus 116 under program control back to an appropriate location, i.e. register, in local storage means 100.

The data processing system of FIG. 2 further comprises a control storage means 120 which contains the instructions comprising the program for control of the data processing system. The abbreviated block diagram representation of storage means 120 is intended to include the usual arrangement of address and storage registers which are included with a control store in systems of this type known to those skilled the art. Words from local storage means 100 are transmitted through a bus 122 to the input of control storage means 120, and words fetched from control storage means 120 can be transmitted through a bus 124 back to an appropriate location in local storage means 100 if desired. The instructions words fetched from control storage means 120 also are transmitted to the input of a control means generally designated 126 which functions to convert the instruction words into control signals for controlling the components of the system in a manner readily understood by those skilled in the art. The control functions produced by means 126 are transmitted by a plurality of control lines, which for convenience are collectively designated 128, connected to the various buses and components in the system. For convenience in illustration, all components in the system of FIG. 2 to which control means 126 is connected are provided with a fragmentary line 128, it being understood that each line 128 represents a plurality of control lines which connect the system components to the control means 126.

The data processing system of FIG. 2 further comprises an external storage means 130 comprising a plurality of registers, some of which are connected to peripheral or input-output equipment and other registers which provide specialized functions for the system depending upon its particular nature and intended use. Main memory or storage means 102 is connected through buses 104 and 106 to storage means 130 and local storage means 100 is connected through buses 132 and 134 to storage means 130.

The data processing system of FIG. 2 can also comprise a group of selection registers (not shown) used to specify the attachment of the buses shown in FIG. 2 to the registers in local storage means 100 as determined by values placed in the group of selection registers. A scheme may be used whereby when these selection registers are provided with values greater than a certain number, these registers then address registers of the external storage means 130 instead of the registers of local storage means 100. In this connection, but 132 could represent two buses connected in series, the first of which would be associated with a selection register of this group for pointing to the register of local storage means 100 from which data is to be transmitted while the value in a selection register associated with the second bus would specify the register of storage means 130 into which the data would be transmitted. Similarly, bus 134 could instead comprise two series-connected buses wherein a selection register associated with one bus points to the register of external storage means 130 from which data is to be transmitted while the value in the selection register associated with the second bus would specify the register of local storage means 100 into which the word is to be placed.

A source of clock or timing pulses for the system is shown at 140 in FIG. 2 and the pulses generated by source 140 are transmitted to various components by a line 142, also designated c. For convenience in illustration, fragmentary portions of line 42 are shown at the location of application to each components such as operation means 112, it being understood that all of these lines are connected to the output of source 140.

In accordance with the present invention, the path connecting the output of main memory 102 through bus 106 to local store 100 is modified to include the word format varying apparatus 110 of the present invention. When the data processing system of FIG. 2 is used to emulate other machines, the instruction words of the machine being emulated are stored in the memory 102. In most instances, the format of the instruction word of the machine being emulated is different from the format of the words stored in control store 120. In particular, the operation code may be present in the three high order bits of the instruction word of one type of machine being emulated, and therefore it is necessary to rearrange the bits or groups of bits, placing them in the low order positions of the host system of FIG. 2, to determine the type of instruction so that a corresponding instruction can be executed by the machine of FIG. 2. In this connection, a table is programmed into control storage means 120 containing instruction codes corresponding to these of the machine being emulated, and these codes are placed within a predetermined range of address locations. For example, the instructions might be placed at address locations 200 to 231, and thus the base of index value will be 200. These instruction codes comprise starting instructions for the set of operation codes of the virtual machine, and the number of starting instructions programmed into the host machine will equal the number of operations codes in the virtual or emulated machine and in a corresponding order or sequence. The starting instructions, in turn, can of course point to programs stored elsewhere in control storage means 120 for executing the emulated instructions.

The apparatus 110 of the present invention shown in FIG. 2 rotates the bits in the instruction word fetched from memory 102 to change the bit positions, and it masks selected bits or groups thereof whereby only the selected bits or groups are gated to local store 100. The apparatus 110 also adds an index value to the gated portion of the instruction whereby the location in control store 120 addressed by the word can be controlled. A line 150 represents the path leading from the output of main memory 102 and having a width equal to the width of the system paths which, for example, can be eighteen. The apparatus 110 includes a shift register means 152 which is 18 bits wide and to which path 150 is connected. Shifter 152 operates to rotate the bits contained therein by a number of bit positions as determined by the decoded value of a quantity present in a path 154. The quantity may for example be five bits in length and path 154 is selectively connected to one of a plurality of five bit fields of a register 156 which preferably is a register of external storage means 130 as will be described presently.

The eighteen output positions of shifter 152 are connected by corresponding lines to one of 18 AND gates, line 158 and gate 160 in FIG. 2 representing one of 18 similar arrangements. The other input of each AND gate is connected by a line such as line 162 to a corresponding one of 18 bit positions of a mask register 164 which also preferably is a register of external storage means 130. Accordingly, the bits present in shifter 152 will be gated through the arrangement 110 only if a logical one is present in the corresponding bit position of the mask register 164, and in this manner only the desired bits or groups of bits in an instruction word are gated to local store 100.

The apparatus 110 further comprises an adder 170 wherein one set of inputs is the 18 bit path 172 leading from the network of AND gates such as gate 160. The other set of inputs to adder 170 is connected by path 174 to a register 176 which contains an index value which is added to each word before it is gated to local store 100. Register 176 also preferably is included within external storage means 130. The 18 bit output of adder 170 represented by path 178 is gated to local store 100 through the bus 106. Shifter 152, the network including AND gate 160 and adder 170 of the arrangement 110 can be bypassed by an 18 bit path connected across the components. One of the 18 lines of this path is shown in FIG. 2 and includes a line 180 connected to one input of AND gate 182, the output of which is connected by a line 184 to bus 106. The line 186 connects the other input of AND gate 183 to a control function from control means 126.

By way of example in a digital data processing system including 18 bit paths throughout, there can be three sets of rotate, mask and index values. Therefore, one register of external storage means 130 is divided into three rotating fields, and the mask and index values can be stored in two groups of three registers in the external storage means 130. A control function from control means 126 for controlling the gating of main memory 102 can contain three bits and determine whether the apparatus 110 is to operate or to be by-passed through the shunt path, and the three bits can select the three sets of rotate, mask and index quantities if the apparatus 110 is to operate.

The system of FIG. 2 operates in the following manner. A word from local store 100 fetches or addresses a word in control store 120 which, in turn, causes control means 126 to provide control functions for operating the rest of the system. Three bits of a control function can be used to control the apparatus 110. Assume that the one bit controlling the shunt or by-pass path is a logical zero applied to line 186 so that AND gate 182 does not operate. The three bits also select a set of rotate, mask and index quantities from registers 156, 164 and 176 which, in turn, are applied to a shifter 152, gate 160 and adder 170, respectively.

A word fetched from main memory 102 in response to a function from control means 126 is transmitted through path 150 to the inputs of shifter 152 because gate 182 is not transmitting. Apparatus 110 rotates, masks and indexes the word in the manner as explained in detail in conjunction with FIG. 1. The transformed word appears in path 178 and is transmitted through bus 106 for use in the system.

FIG. 3 shows an arrangement of a multiplicity or plurality of units of the word transformation apparatus of the present invention in a digital information processing system. The system illustrated in FIG. 3 is similar to the system of FIG. 1 and includes a storage device 10' like storage device 10 and a utilization device 90' like device 90. The system includes a plurality of units, in the present illustration three, of the word transformation apparatus connected in the path in parallel between storage device 10' and utilization device 90'. The units designated 200, 201 and 202 in FIG. 3 also are each identified with the letters RMI which represent the Rotate, Mask and Index operations of the word transformation apparatus. Thus each RMI unit, for example unit 200 in FIG. 3, includes an arrangement of shifter and means for supplying rotate quantities thereto, gates at the shifter outputs and means for supplying mask quantities to the gates, and an adder and means for supplying index quantities to the adder like the arrangement shown in FIG. 1.

Line 204 in FIG. 3 represents a path leading from the output of storage device 10' which path comprises a number of lines equal to the number of bits to be transmitted. For example, path 204 can comprise seven lines for a seven bit system path. Path 204, in turn, is connected at spaced locations therealong by paths 206, 207 and 208 to the corresponding inputs of RMI units 200, 201 and 202, respectively. Each path 206, 207 and 208 of course includes a number of lines equal to the number of lines of path 204. The outputs of units 200, 201 and 202 are connected through paths 210, 211 and 212, respectively, to a logical OR device 214. Each of the output paths 210, 211 and 212 contains the same number of lines as the corresponding input path, i.e. seven lines in the present example. When a quantity is present in any of the paths 210, 211 and 212 OR device or gate 214 transmits that quantity to a path 216 leading to the input of the system utilization device 90'.

The arrangement of FIG. 3 allows the simultaneous extraction and manipulation of multiple fields from words in storage device 10'. In addition, this arrangement allows for multiple sets of rotate, mask and index quantities, the particular one of which can be selected by the system invoking command.

The arrangement of a plurality of units of the word transformation apparatus of the present invention also, of course, can be included in a digital data processing system similar to that of FIG. 2. In this case, there would be a plurality of RMI units, each like the apparatus designated 110 in FIG. 2, connected in parallel between path 150 and bus 106 in a manner similar to the connection of the RMI units between paths 204 and 216 in the arrangement of FIG. 2. The plurality of rotate, mask and index quantities would be stored at a convenient location in the system, with suitable provision for addressing or selection of the quantities such as by the invoking command.

It is therefore apparent that the present invention accomplishes its intended objects. While several embodiments of the present invention have been described in detail, this is for the purpose of illustration, not limitation.

I claim:

1. In a digital information processing system wherein coded information words are transmitted from a first location in the system through a path to a second location for utilization by said system, word transformation apparatus comprising:
   a. word position changing means having an input connected to said path to receive words from said first location and operative to change the relative positions of portions of a word received thereby in a predetermined manner so that a portion of the word which is of current interest is placed in a predetermined location in the word;
   b. selective gating means having an input connected to the output of said position changing means and an output connected to said path and operative to gate only said portion of said word placed in said predetermined location to said path for transmission to said second location; and
   c. means operatively connected to the output of said selective gating means for adding a quantity to the word portion before it is transmitted to said second system location.

2. Apparatus according to claim 1, wherein said word position changing means comprises:
   a. shift register means having a number of bit positions equal to the number of bits in the words which travel through the system path and operative to rotate the bits of a word placed therein so as to change the relative positions of bits or groups of bits of the word; and
   b. means operatively connected to said shift register means for controlling the number of bit positions in a rotation.

3. Apparatus according to claim 1, wherein said selective gating means comprises:
   a. a plurality of AND gates equal in number to the number of bits in the words which travel through the system path, one input of each gate being connected to a corresponding bit position at the output of said word position changing means; and
   b. means connected to the other input of each of said AND gates for controlling the bits or groups of bits in the word which are gated to said second system location.

4. Apparatus according to claim 3, wherein said means controlling the bits or groups thereof which are gated comprises a register having a number of bits equal to the number of AND gates, each bit location being connected to a corresponding AND gate input, said register containing a logical one in the bit position corresponding to those AND gates which are to allow transmission of bits to said second system location and containing a logical zero in each remaining bit position.

5. In a data processing system including main memory means, local storage means containing a plurality of registers which comprise the working registers for the system, and path means connecting said main memory means to said local storage means for transmitting words from said main memory means to said local storage means, the improvement comprising:
  a. means operatively connected to said path for varying the format of words transmitted from said main memory means to said local storage means in accordance with parameters supplied thereto;
  b. storage means containing said parameters;
  c. control means operatively connected to said format varying means and to said storage means for selecting parameters and controlling said format varying means;
  d. means having an input operatively connected to said format varying means and an output for transmitting only a predetermined portion of words from said format varying means; and
  e. means operatively connected to the output of said transmitting means for adding a quantity to the word portion before it is transmitted to said local storage means.

6. Apparatus according to claim 5 further including:
  a. an addressable control storage means operatively connected to said local storage means; and
  b. said quantity added to the word portion being utilized for addressing said control storage means.

7. Apparatus according to claim 5, wherein said format varying means comprises word position changing means for receiving words transmitted from said main memory means and operative to change the relative positions of portions of a word received thereby in a predetermined manner so that a portion of the word which is of current interest is placed in a predetermined location in the word; and wherein said transmitting means comprises selective gating means having an input connected to the output of said position changing means and an output coupled by said adding means to said local storage means and operative to gate only said portion of said word placed in said predetermined location to said local storage means in accordance with parameters supplied thereto, another storage means containing said parameters for said gating means, and said control means being operatively connected to said selective gating means and to said storage means for selecting parameters and controlling said selective gating means.

8. A digital data processing method comprising the steps of:
  a. storing instruction words in a main memory;
  b. fetching an instruction word from said memory and placing the fetched word in a shift register;
  c. operating said shift register to rotate the bits of the instruction word contained therein by a predetermined number of bit positions;
  d. masking certain bits and gating the remaining bits contained in said shift register so that only a selected portion of the instruction word is obtained; and
  e. transmitting the selected portion of the instruction word to a local storage means.

9. A method according to claim 8 further including a step of adding a constant value to the selected portion of the instruction word before it is transmitted to said local storage means.

10. A method according to claim 8 wherein instruction words of a machine being emulated are stored in said main memory and wherein a table containing instruction codes corresponding to those of the machine being emulated is programmed into a control storage means within a predetermined range of address locations and further including a step of adding an index value to the selected portion of the instruction word before it is transmitted to said local storage means whereby the location in said control store addressed by the instruction word can be controlled.

* * * * *